(12) United States Patent
Choi et al.

(10) Patent No.: US 11,283,124 B2
(45) Date of Patent: Mar. 22, 2022

(54) LITHIUM AIR BATTERY

(71) Applicant: SAMSUNG ELECTRONICS CO., LTD., Suwon-si (KR)

(72) Inventors: Wonsung Choi, Hwaseong-si (KR); Mokwon Kim, Suwon-si (KR); Taeyoung Kim, Seoul (KR); Jungock Park, Yongin-si (KR); Hyunpyo Lee, Seoul (KR); Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 40 days.

(21) Appl. No.: 16/993,370

(22) Filed: Aug. 14, 2020

(65) Prior Publication Data

US 2021/0194078 A1    Jun. 24, 2021

(30) Foreign Application Priority Data

Dec. 23, 2019  (KR) .................. 10-2019-0173467

(51) Int. Cl.
*H01M 12/02* (2006.01)
*H01M 12/08* (2006.01)
*H01M 4/86* (2006.01)
*H01M 4/38* (2006.01)
*H01M 4/02* (2006.01)

(52) U.S. Cl.
CPC .......... *H01M 12/02* (2013.01); *H01M 4/382* (2013.01); *H01M 4/8605* (2013.01); *H01M 12/08* (2013.01); *H01M 2004/027* (2013.01); *H01M 2004/8689* (2013.01)

(58) Field of Classification Search
CPC .... H01M 12/02; H01M 4/382; H01M 4/8605; H01M 12/08; H01M 2004/027; H01M 2004/8689

See application file for complete search history.

(56) References Cited

U.S. PATENT DOCUMENTS

| | | | |
|---|---|---|---|
| 9,070,953 B2 | 6/2015 | Yamada et al. | |
| 10,381,698 B2 | 8/2019 | Ko et al. | |
| 11,056,738 B2 * | 7/2021 | Kim | ...................... H01M 12/06 |
| 2016/0344076 A1 | 11/2016 | Park et al. | |
| 2017/0222287 A1 | 8/2017 | Suzuki et al. | |
| 2020/0144687 A1 * | 5/2020 | Lee | ........................ H01M 12/02 |

FOREIGN PATENT DOCUMENTS

| | | |
|---|---|---|
| JP | 5751589 B2 | 7/2015 |
| KR | 1020160128886 A | 11/2016 |
| KR | 1020160136080 A | 11/2016 |

* cited by examiner

*Primary Examiner* — Stewart A Fraser
(74) *Attorney, Agent, or Firm* — Cantor Colburn LLP

(57) ABSTRACT

A lithium air battery including: a lithium air cell including a cathode configured to use oxygen as cathode active materials, an anode capable of storing and releasing lithium ions, and an electrolyte disposed between the cathode and the anode; and a water vapour supply unit including a basic metal compound and water, wherein the water vapour supply unit is configured to supply water to the cathode of the lithium air cell.

20 Claims, 10 Drawing Sheets

LITHIUM AIR BATTERY

CROSS-REFERENCE TO RELATED APPLICATION

This application claims priority to and the benefit of Korean Patent Application No. 10-2019-0173467, filed on Dec. 23, 2019, in the Korean Intellectual Property Office, the content of which in its entirety is herein incorporated by reference.

BACKGROUND

1. Field

The present disclosure relates to a lithium air battery

2. Description of Related Art

A lithium air battery includes an anode capable of absorbing and releasing lithium ions and a cathode that uses oxygen in air as an active material. In the cathode, oxygen flowing from outside of the lithium air battery is reduced and oxidized, and in the anode, lithium is reduced and oxidized. Chemical energy generated from the reduction and oxidation reactions is converted into electrical energy. For example, the lithium air battery absorbs oxygen during discharge, and releases oxygen during charge. A lithium air battery may use oxygen in air, and an energy density of a lithium air battery may be improved. For example, the lithium air battery may have an energy density several times higher than an energy density of a lithium ion battery.

SUMMARY

Provided is a lithium air battery in which the amount of carbon dioxide in water or air is reduced to improve lifetime.

Additional aspects will be set forth in part in the description which follows and, in part, will be apparent from the description.

According to an aspect, a lithium air battery includes: a lithium air cell including a cathode configured to use oxygen and water as a cathode active material, an anode capable of storing and releasing lithium ions, and an electrolyte disposed between the cathode and the anode; and a water vapour supply unit including a basic metal compound and water, and configured to supply water vapour to the lithium air cell, wherein the water vapour supply unit is configured to supply water to the cathode of the lithium air cell.

The basic metal compound may comprise an alkaline metal or an alkaline earth metal. The basic metal compound may include NaOH, CaO, $Ca(OH)_2$, MgO, or $Mg(OH)_2$. A concentration of the basic metal compound in a solution including the basic metal compound in the water vapour supply unit may be about 0.1 grams per liter to about 1 gram per liter. A solution including the basic metal compound in the water vapour supply unit may have a pH of 9 to 14.

The water vapour supply unit may be configured to supply water vapour from which an acidic impurity is removed. The acidic impurity may include carbon dioxide.

The lithium air battery may include a gas storage container in which the lithium air cell and the water vapour supply unit are located, and the gas storage container may have an atmosphere including oxygen.

The lithium air battery may include a gas storage container having an atmosphere including oxygen in which the lithium air cell is disposed, and the water vapour supply unit may be in fluid communication with the gas storage container to supply water vapour to the gas storage container.

The water vapour supply unit may include a membrane on a surface of the lithium air cell, and the membrane may include a solution including the basic metal compound. The membrane may be located on the cathode of the lithium air cell. The membrane may include a nonwoven fabric.

The lithium air battery may include a gas storage container having an atmosphere including oxygen in which the water vapour supply unit is located, and the gas storage container may be in fluid communication with the lithium air cell and may be configured to supply water vapour and oxygen to the lithium air cell. The gas storage container may be configured to supply water vapour and oxygen from the gas storage container to a cathode of the lithium air cell.

The cathode may include a porous conductive material. The anode may include lithium. The electrolyte may include a solid electrolyte. The electrolyte may include a liquid electrolyte. The liquid electrolyte may include an organic electrolyte. The electrolyte may include an aqueous electrolyte.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
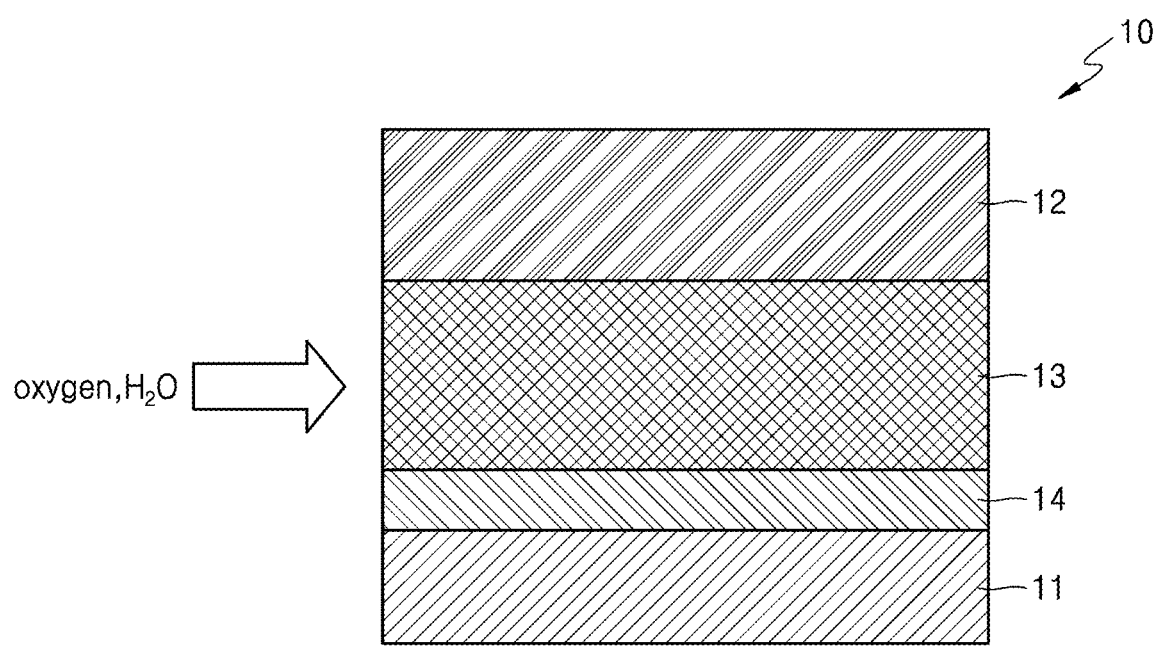
FIG. 1 is a schematic view of an embodiment of a lithium air cell.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" comprises any and all combinations of one or more of the associated listed items. Throughout the disclosure, the expression "at least one of a, b or c" indicates only a, only b, only c, both a and b, both a and c, both b and c, all of a, b, and c, or variations thereof.

Hereinafter, lithium air batteries according to embodiments will be described in detail with reference to the attached drawings. The widths and thicknesses of the layers or areas illustrated in the attached drawings may be somewhat exaggerated for clarity and convenience of description.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the phrase "lithium air cell" refers to a device comprising a cathode, anode, and an electrolyte.

As used herein, the phrase "lithium air battery" or "battery" refers to a device comprising at least one lithium air cell.

As used herein, the term "basic metal compound" refers to a compound that provides a pH of greater than 7, e.g., a pH of 9 to 14, when contacted with water.

A C rate means a current which will discharge a battery in one hour, e.g., a C rate for a battery having a discharge capacity of 1.6 ampere-hours would be 1.6 amperes.

Hereinafter, lithium air a battery will be described in more detail.

A lithium air battery according to an embodiment comprises a lithium air cell and a water vapour supply unit.

Lithium Air Cell

The lithium air cell comprises a cathode configured to use oxygen and water as a cathode active material, an anode capable of storing and releasing lithium ions, and an electrolyte disposed between the cathode and the anode.

Cathode

The cathode is an electrode which configured to use oxygen, e.g., $O_2$, and water vapour ($H_2O$) in air as an active material. For the electrochemical reaction of lithium ions provided from the anode and air (that is, oxygen) and water vapour provided from the cathode, the cathode may provide a path for the migration of lithium ions and electrons.

When the lithium air cell is discharged, the following electrochemical reaction may occur at the cathode.

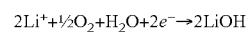

$$2Li^+ + \tfrac{1}{2}O_2 + H_2O + 2e^- \rightarrow 2LiOH$$

Lithium ions ($Li^+$) provided from the anode, water vapour ($H_2O$), and oxygen provided from the atmosphere (e.g., air or $O_2$) may combine (react) with electrons ($e^-$) at the surface of the cathode to produce lithium hydroxide (LiOH). In this case, the cathode may provide both a migration path for lithium ions ($Li^+$) and a migration path for electrons ($e^-$). Lithium hydroxide (LiOH) produced in this way is an example of a reaction product. During charge, a discharge reaction may proceed in reverse.

The cathode is permeable to gases such as oxygen, air, and water vapour. The cathode may be porous, gas-permeable, or a combination thereof, and oxygen, air, water vapour, and the like may diffuse into the cathode. Further, lithium ions, electrons, or a combination thereof may migrate through a cathode which is a mixed conductor (i.e., provides both ion and electron conductivity), and the electrochemical reaction of oxygen, water vapour, lithium ions, and electrons in the cathode may proceed.

The cathode may comprise a lithium-containing metal oxide. Examples of the lithium-containing metal oxide may be a spinel compound, a perovskite compound, a layered compound, a garnet compound, a sodium super ionic conductor ("NASICON") compound, a lithium super ionic conductor ("LISOCON") compound, a phosphate compound, a tavorite compound, a triplite compound, an anti-perovskite compound, a silicate compound, and a borate compound. A combination comprising at least one of the foregoing may be used.

Specific examples of the lithium-containing metal oxide may be, but are not limited to, $LiMn_2O_4$, $LiTiNbO_4$, $Li_4Ti_5O_{12}$, $Li_4Mn_5O_{12}$, $Li_{4.5}Ti_{4.5}Gd_{0.5}O_{12}$, $Li_{0.31}La_{0.56}TiO_3$, $Li_{0.34}La_{0.55}RuO_3$, $Li_{0.2}Ca_{0.6}Mn_{0.5}Ni_{0.5}O_3$, $LiNiO_2$, $LiCoO_2$, $LiMnO_2$, $LiNi_{1-x}Mn_xO_{2y}$ (wherein $0<x<1$ and $0<v\leq0.5$), $LNi_{1-x-y}Co_xMn_yO_2$ (wherein $0<x\leq0.5$ and $0<y\leq0.5$), $LiNi_{0.8}Co_{0.1}Mn_{0.1}O_2$, $LiNi_{1-x-y}Co_xAl_yO_2$ (wherein $0<x\leq0.5$ and $0<y\leq0.5$), $Li_{1.3}Al_{0.3}Ti_{1.7}(PO_4)_3$, $Li_{1.3}Al_{0.3}Ge_{1.7}(PO_4)_3$, $Li_{1.3}Al_{0.3}Zr_{1.7}(PO_4)_3$, $Li_4SiO_4$, $Li_{3.75}Si_{0.75}P_{0.25}O_4$, $Z_{14}Zn(GeO_4)_4$, $Li_{3.4}V_{0.6}Ge_{0.4}O_4$, $Li_{3.5}V_{0.5}Ti_{0.5}O_4$, $Li_3Tb_3Te_2O_{12}$, $Li_{4.22}Al_{0.26}La_3Zr_2WO_{12}$, $Li_5La_3Nb_2O_{12}$, $Li_6BaLa_2Ta_2O_{12}$, $Li_7La_3Zr_2O_{12}$, $LiFePO_4$, $LiMnPO_4$, $LiCoPO_4$, $LiNiPO_4$, $Li_2MnP_2O_7$, $Li_2FeP_2O_7$, $LiVO(PO_4)$, $LiV(PO_4)F$, $LiFe(SO_4)F$, $Li_2Fe(PO_4)F$, $Li_3OCl$, $Li_2OHBr$, $Li_2(OH)_{0.9}F_{0.1}Cl$, $Li_3OCl_{0.5}Br_{0.5}$, $Li_2MnSiO_4$, $Li_2FeSiO_4$, $LiFeBO_3$, and $LiCoBO_3$.

Optionally, the cathode may further increase electron conductivity and ion conductivity by adding a conductive material in addition to the lithium-containing metal oxide. The conductive material may be porous. The conductive material may have porosity, and penetration of air may be facilitated. Any suitable conductive material having porosity, conductivity, or a combination thereof may be used. For example, the conductive material may be a carbon-based material. Examples of the carbon-based material comprise, but are not limited to, carbon black, graphite, graphene, active carbon, and carbon fiber. Any suitable carbon-based material may be used. The conductive material is, for example, a metallic material. The metallic material is, for example, metal fiber, metal mesh, or metal powder. The metal powder is, for example, copper, silver, nickel, or aluminum. Two or more conductive materials may be used.

The cathode may further comprise a catalyst for oxidation/reduction of oxygen. Examples of the catalyst may comprise, but are not limited to, noble metal catalysts such as platinum, gold, silver, palladium, ruthenium, rhodium and osmium, oxide catalysts such as manganese oxide, iron oxide, cobalt oxide, and nickel oxide, and organometallic catalysts such as cobalt phthalocyanine. Any suitable catalyst for oxidation/reduction of oxygen may be used.

The catalyst may be supported on a carrier. The carrier may be, for example, an oxide carrier, a zeolite carrier, a clay mineral carrier, or a carbon carrier. The oxide carrier is, for example, a metal oxide carrier including at least one metal of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide carrier comprises, for example, alumina, silica, zirconium oxide, or titanium dioxide. Examples of the carbon carrier may comprise, but are not limited to, carbon blacks such as Ketjen black, acetylene black, tannel black, and lamp black; graphite such as natural graphite, artificial graphite, and expanded graphite; active carbons; and carbon fibers. Any suitable carbon carrier may be used.

The cathode may further comprise a binder. The binder comprises, for example, a thermoplastic resin or a thermosetting resin. The binder may include, for example, at least one of a polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, or an ethylene-acrylic acid copolymer, but is not limited thereto. Any suitable binder may be used.

The cathode may be prepared by mixing a conductive material, a catalyst for oxidation/reduction of oxygen, and a binder, adding a suitable solvent to the mixture to prepare a cathode slurry, and then applying the cathode slurry to the surface of a substrate and drying the cathode slurry or compression molding of the cathode slurry to the substrate to improve electrode density. The substrate is, for example, a cathode current collector, a separator, or a solid electrolyte layer. The cathode current collector is, for example, a gas diffusion layer. The conductive material may comprises a composite, e.g., a composite of metal and graphite, for example. In the cathode, the catalyst for oxidation/reduction of oxygen and the binder may be omitted depending on the kind of a cathode desired.

Anode

The anode may comprise a material capable of absorbing or releasing lithium ions. For example, the anode may comprise at least one of lithium, a lithium-based alloy, or a lithium intercalating compound. The lithium-based alloy may be, for example, an alloy of lithium and aluminum, tin, magnesium, indium, calcium, titanium, or vanadium.

Electrolyte Layer

The electrolyte layer comprises at least one of a solid electrolyte, a gel electrolyte, or a liquid electrolyte. The solid electrolyte, the gel electrolyte, and the liquid electrolyte are not particularly limited.

The solid electrolyte comprises at least one of a solid electrolyte including an ion conductive inorganic material, a solid electrolyte including polymeric ionic liquid ("PIL") and a lithium salt, a solid electrolyte including an ion conductive polymer and a lithium salt, or a solid electrolyte including electron conductive polymer, but is not limited thereto. Any suitable solid electrolyte may be used.

The ion conductive inorganic material comprises at least one of a glass or amorphous metal ion conductor, a ceramic active metal ion conductor, or a glass ceramic active metal ion conductor, but is not limited thereto. Any suitable ion conductive inorganic material may be used. The ion conductive inorganic material is, for example, ion conductive inorganic particles or a molded product in the form of a sheet thereof.

The ion conductive inorganic material is, for example, at least one of $BaTiO_3$, $Pb(Zr_xTi_{1-x})O_3$ (wherein $0\leq x\leq 1$) ("PZT"), $Pb_{1-x}La_xZr_{1-y}Ti_yO_3$ ("PLZT") (wherein $0\leq x<1$, $0\leq y<1$), $Pb(Mg_3Nb_{2/3})_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$ (wherein $0<x<2$ and $0<y<3$), lithium aluminum titanium phosphate ("LATP", $Li_xAl_yTi_z(PO_4)_3$, wherein $0<x<2$, $0<y<1$, and $0<z<3$), $L_{1+x+y}(Al_mGa_{1-m})_x(Ti_nGe_{1-n})_{2-x}Si_yP_{3-y}O_{12}$ (wherein $0\leq x\leq 1$, $0\leq y\leq 1$, $0\leq m\leq 1$, and $0\leq n\leq 1$), lithium lanthanum titanate ($Li_xLa_yTiO_3$, wherein $0<x<2$, and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$, and $0<y<2$), $SiS_2$, $Li_xSi_yS_z$-based glass (wherein $0<x<3$, $0<y<2$, and $0<z<4$), $P_2S_5$, $Li_xP_yS_z$-based glass (wherein $0<x<3$, $0<y<3$, and $0<z<7$), $Li_2O$, LiF, LiOH, $Li_2CO_3$, $LiAlO_2$, a $Li_2O—Al_2O_3—SiO_2—P_2O_5—TiO_2—GeO_2$-based ceramic, or a Garnet-based ceramic ($Li_{3+x}La_3M_2O_{12}$ (M=Te, Nb, or Zr)). A combination comprising at least one of the foregoing may be used.

The polymeric ionic liquid ("PIL") comprises, for example, a repeating unit including i) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2FSO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2)_2PO—$, or $(CF_3SO_2)_2N$. Examples of the polymeric ionic liquid comprise poly(diallyldimethylammonium) bis(trifluoromethanesulfonyl)imide ("TFSI"), poly(1-allyl-3-methylimidazolium trifluoromethanesulfonylimide), and poly((N-Methyl-N-propylpiperidinium bis(trifluoromethane sulfonyl)imide). A combination comprising at least one of the foregoing may be used.

The ion conductive polymer comprises at least one ion conductive repeating unit of ether, acrylic, methacrylic, or a siloxane monomer.

Examples of the ion conductive polymer comprise, but are not limited to, polyethylene oxide ("PEO"), polyvinyl alcohol ("PVA"), polyvinylpyrrolidone ("PVP"), polyvinyl sulfone (polysulfone) polypropylene oxide ("PPO"), polymethyl methacrylate, polyethyl methacrylate, polydimethylsiloxane, polyacrylic acid, polymethacrylic acid, polymethyl acrylate, polyethyl acrylate, poly 2-ethylhexyl acrylate, polybutyl methacrylate, poly 2-ethylhexyl methacrylate, polydecyl acrylate, polyethylenevinylacetate, a phosphate ester polymer, polyester sulfide, polyvinylidene fluoride ("PVdF"), and Li-substituted Nafion. Any suitable ion conductive polymer may be used.

Examples of the electron conductive polymer comprise, but are not limited to, polytriphenylene derivatives and polythiophene derivatives. Any suitable electron conductive polymer may be used.

The gel electrolyte is obtained by additionally adding a low-molecular-weight solvent to the solid electrolyte disposed between the cathode and the anode. The gel electrolyte is obtained by additionally adding a solvent, oligomer, or the like, which is a low-molecular-weight organic compound, to a polymer. The gel electrolyte is obtained by additionally adding a solvent, oligomer, or the like, which is a low-molecular-weight organic compound, to the aforementioned polymer electrolyte.

The liquid electrolyte comprises a solvent and a lithium salt.

The solvent comprises, but is not necessarily limited to, at least one of an organic solvent, an ionic liquid, or an oligomer. Any suitable solvent that is liquid at room temperature (25° C.) may be used.

The organic solvent comprises at least one of an ether-based solvent, a carbonate-based solvent, an ester-based solvent, or a ketone-based solvent. The organic solvent comprises, but is not limited to, for example, at least one of propylene carbonate, ethylene carbonate, fluoroethylene carbonate, vinyl ethylene carbonate butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dimethoxyethane, sulfolane, dichloroethane, chlorobenzene, nitrobenzene, succinonitrile, diethylene glycol dimethyl ether ("DEGDME"), tetraethylene glycol dimethyl ether ("TEGDME"), polyethylene glycol dimethyl ether ("PEGDME", number average molecular weight (Mn)=500 Daltons), dimethyl ether, diethyl ether, dibutyl ether, dimethoxyethane, 2-methyltetrahydrofuran, or tetrahydrofuran. Any suitable organic solvent that is liquid at room temperature (25° C.) may be used.

The ionic liquid ("IL") comprises, for example, i) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N$.

The lithium salt comprises, but is not limited to, at least one of lithium bis(trifluoromethanesulfonyl)imide ("LiTFSI"), $LiPF_6$, $LiBF_4$, $LiAsF_6$, $LiClO_4$, $LNO_3$, (lithium bis(oxalato) borate ("LiBOB"), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate ("LiTfO"). Any suitable lithium salt may be used. The concentration of the lithium salt is, for example, about 0.01 M to about 5.0 M.

The lithium air battery may further comprise a separator between the anode and the cathode. The separator desirably has a composition that may withstand the range of use of the lithium air battery. Examples of the separator comprise at least one of a polymer nonwoven fabric such as polypropylene nonwoven fabric or polyphenylene sulfide nonwoven fabric, a porous film of an olefin resin such as polyethylene or polypropylene, or glass fiber.

The electrolyte layer may have a structure in which the solid polymer electrolyte is impregnated in the separator or a structure in which the liquid electrolyte is impregnated in the separator. The electrolyte layer having a structure in which the solid polymer electrolyte is impregnated in the separator may be prepared by placing a solid polymer electrolyte film on one surface or both surfaces of the separator and then press-rolling the solid polymer electrolyte film. The electrolyte layer having a structure in which the liquid electrolyte is impregnated in the separator may be prepared by injecting the liquid electrolyte containing a lithium salt into the separator.

FIG. 1 is a schematic view of a lithium air cell according to an embodiment. Referring to FIG. 1, a lithium air cell 10 may comprise an anode 11, a cathode 12, a solid electrolyte layer 13, and an anode electrolyte layer 14. The anode 11 may comprise at least one of lithium, a lithium-based alloy, or a lithium intercalating compound. The cathode 12 may comprise a mixed conductor. The solid electrolyte layer 13 may comprise a mixed conductor capable of both electron conduction and metal ion conduction.

As described above, the mixed conductor present in the cathode 12 and the solid electrolyte layer 13 may be an inorganic material-based solid compound. Accordingly, the cathode 12 and the solid electrolyte layer 13 may be electrodes not including an organic electrolyte, that is, organic electrolyte-free electrodes. Further, the cathode 12 may be an electrode not including a liquid electrolyte, that is, a liquid electrolyte-free electrode. The cathode 12 may further comprise an aqueous electrolyte.

The anode electrolyte layer 14 may comprise an ion conductive material to enable conduction of ions between the anode 11 and the cathode 12. The anode electrolyte layer 14 may comprise a solid electrolyte. The electrolyte of the anode electrolyte layer 14 may be solid phase which comprises at least one of a polymer electrolyte or an inorganic electrolyte. For example, as the anode electrolyte layer 14, polymer nonwoven fabric such as polypropylene nonwoven fabric or polyphenylene sulfide nonwoven fabric, a porous film of an olefin resin such as polyethylene or polypropylene may be used. Any suitable material may be used for, e.g., as, the solid electrolyte. The anode electrolyte layer 14 may comprise a liquid electrolyte.

Although not shown in FIG. 1, a gas diffusion layer may be disposed to absorb oxygen in the atmosphere and provide the oxygen to the cathode 12. For this purpose, the gas diffusion layer may have a porous structure to diffuse, e.g., capable of diffusing, oxygen. For example, the gas diffusion layer may be formed using carbon paper, carbon cloth, carbon felt, which uses carbon fiber, foamed metal sponge, or metal fiber mat. The cathode 12 may also be fabricated to have a porous structure or a structure similar thereto so as to serve as the gas diffusion layer. In this case, the gas diffusion layer may be omitted. In addition, a cathode current collector disposed to contact the gas diffusion layer and an anode current collector disposed to contact the anode 11 may be provided.

The lithium air battery according to the present embodiment may be a liquid electrolyte-free battery that does not comprise a liquid electrolyte. Further, the lithium air battery according to the embodiment may be an organic electrolyte-free battery that does not comprise an organic electrolyte. As such, the lithium air battery may be an organic electrolyte-free or a liquid electrolyte-free battery.

Water Vapour Supply Unit

The water vapour supply unit is a device capable of supplying, e.g., configured to supply, water vapour ($H_2O$) to the lithium air cell in order to improve the lithium ion conductivity and electron conductivity of the cathode and reduce the interfacial resistance of the cathode. As an example, the water vapour supply unit may adjust the rate of supplying water vapor ($H_2O$) according to the charge-discharge rate of the lithium air battery.

Water vapour ($H_2O$) supplied through, e.g., by, the water vapor supply unit may be attached to the surface of the cathode to improve lithium ion conductivity and electron conductivity and reduce interfacial resistance. Further, water vapour ($H_2O$) supplied through, e.g., by, the water vapor supply unit may combine (react) with electrons (e−) at the surface of the cathode together with oxygen ($O_2$) provided from the atmosphere (e.g., air or $O_2$) during the discharge process to produce lithium hydroxide (LiOH) or the lithium hydroxide (LiOH) may decompose and provide water vapour ($H_2O$).

The water vapour supply may comprise a basic metal compound in addition to water. The basic metal compound is a basic metal compound of an alkaline metal or an alkaline earth metal. The basic metal compound may comprise NaOH, CaO, $Ca(OH)_2$, MgO, or $Mg(OH)_2$.

A concentration of the basic metal compound in a solution including the basic metal compound in the water vapour supply unit may be about 0.1 grams per liter to about 1 gram per liter. A solution including the basic metal compound in the water vapour supply unit may have a pH of 9 to 14.

About 1.45 grams of carbon dioxide can be dissolved in 1 liter (L) of water at 1 atmosphere at room temperature (e.g., 23° C.). This amount of carbon dioxide is an amount in which, e.g., is equivalent to, 740 milliliters (mL) of carbon dioxide dissolved in 1 L of water, and is an amount capable of reacting with 1,766 milliampere hours per liter (mAh/L) of lithium ions. Even when an air purification system is used, it may be difficult to completely remove carbon dioxide, an acidic impurity, from the air. Water vapour in which carbon dioxide is dissolved may react with a discharge product (LiOH) to produce lithium carbonate ($Li_2CO_3$). In this case, lithium carbonate ($Li_2CO_3$) is difficult to decompose, thereby causing the deterioration of lifetime characteristics. Even a small amount of carbon dioxide remaining in water vapour may affect a lithium air cell.

The basic metal compound may convert carbon dioxide in water into carbonate in a solid state. For example, the reaction of $Ca(OH)_2$ and NaOH with carbon dioxide is as follows.

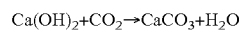
$$Ca(OH)_2 + CO_2 \rightarrow CaCO_3 + H_2O$$

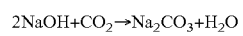
$$2NaOH + CO_2 \rightarrow Na_2CO_3 + H_2O$$

Carbon dioxide in water of the water vapour supply unit is converted into carbonate in a solid state by the basic metal compound, and thus water vapour from which carbon dioxide has been removed may be supplied to the lithium air cell.

Water vapour from which carbon dioxide has been removed may be supplied, thereby improving the lifetime of the lithium air battery.

Figure 2:
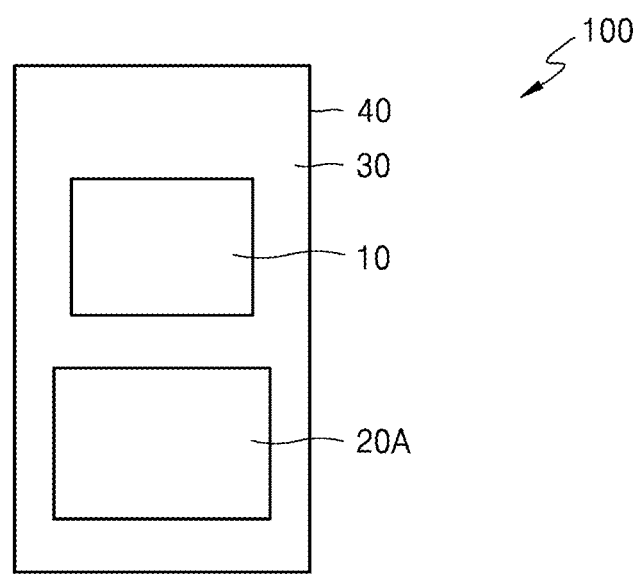
FIG. 2 is a block diagram showing a schematic configuration of an embodiment of a lithium air battery.

FIG. 2 is a block diagram illustrating a schematic configuration of a lithium air battery according to an embodiment. Referring to FIG. 2, a lithium air battery 100 may comprise a lithium air cell 10 and a water vapour supply unit 20A in a gas storage container 40. The lithium air cell 10 and the water vapour supply unit 20A refer to the aforementioned lithium air cell and the aforementioned water vapour supply unit. The inside of the gas storage container 40 may be an atmospheric, e.g., air, or an atmosphere including oxygen 30. The atmosphere including oxygen may include oxygen in an amount of 99.7 volume percent (vol %) or greater. The water vapour supply unit 20A may supply water vapour, from which carbon dioxide has been removed, into the gas storage container 40 by heating or the like. The water vapour, from which carbon dioxide has been removed, may be used as a cathode active material of the lithium air cell together with oxygen.

Figure 3:
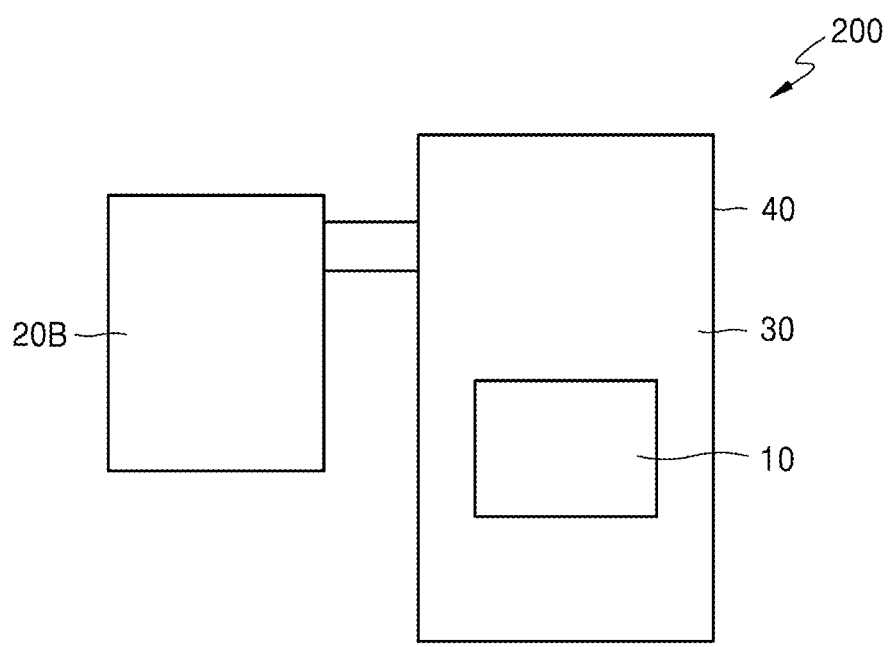
FIG. 3 is a block diagram showing a schematic configuration of an embodiment of a lithium air battery.

FIG. 3 is a block diagram illustrating a schematic configuration of a lithium air battery according to an embodiment. Referring to FIG. 3, a lithium air battery 200 may comprise a lithium air cell 10 inside a gas storage container 40 and a water vapour supply unit 20B outside the gas storage container 40. The lithium air cell 10 and the water vapour supply unit 20B refer to the aforementioned lithium air cell and the aforementioned water vapour supply unit. The inside of the gas storage container 40 may be an atmospheric, e.g., air, or an atmosphere including oxygen 30. The atmosphere including oxygen may include oxygen in an amount of 99.7 vol % or greater. The water vapour supply unit 20B may supply water vapour, from which carbon dioxide has been removed, into the gas storage container 40 by flowing or the like. The water vapour, from which carbon dioxide has been removed, may be used as a cathode active material of the lithium air cell together with oxygen.

Figure 4:
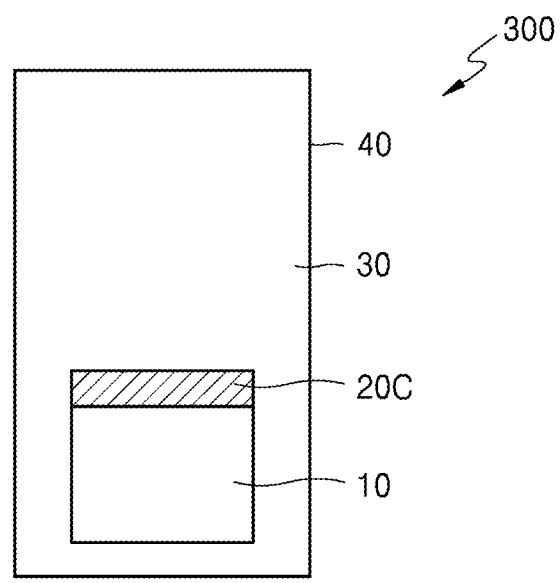
FIG. 4 is a block diagram showing a schematic configuration of an embodiment of a lithium air battery.

FIG. 4 is a block diagram illustrating a schematic configuration of a lithium air battery according to an embodiment. Referring to FIG. 4, a lithium air battery 300 may comprise a lithium air cell 10 inside a gas storage container 40 and a membrane 20C on the upper surface of the lithium air cell 10. For example, the membrane 20C may be located on the cathode of the lithium air cell 10. The lithium air cell 10 refers to the aforementioned lithium air cell. The inside of the gas storage container 40 may be an atmospheric, e.g., air, or an atmosphere including oxygen 30. The atmosphere including oxygen may include oxygen in an amount of 99.7 vol % or greater. The membrane 20C may be a membrane containing a solution including the basic metal compound. The material of the membrane 20C may be, for example, a nonwoven fabric containing a solution including the basic metal compound described herein. The material of the membrane 20C may be any suitable material containing a solution including the basic metal compound and through which air or oxygen, for example, may permeate into the gas storage container 40, in addition to the nonwoven fabric. Water, from which carbon dioxide has been removed by the basic metal compound, may be evaporated from the membrane 20C and supplied to the lithium air cell 10. Carbon dioxide may be removed from air or an atmosphere including oxygen in the gas storage container 40 by passing the air or atmosphere including oxygen through the membrane 20C, the air or atmosphere including oxygen may be supplied to the lithium air cell 10, and oxygen in the air or atmosphere including oxygen maybe used as a cathode active material.

Figure 5:
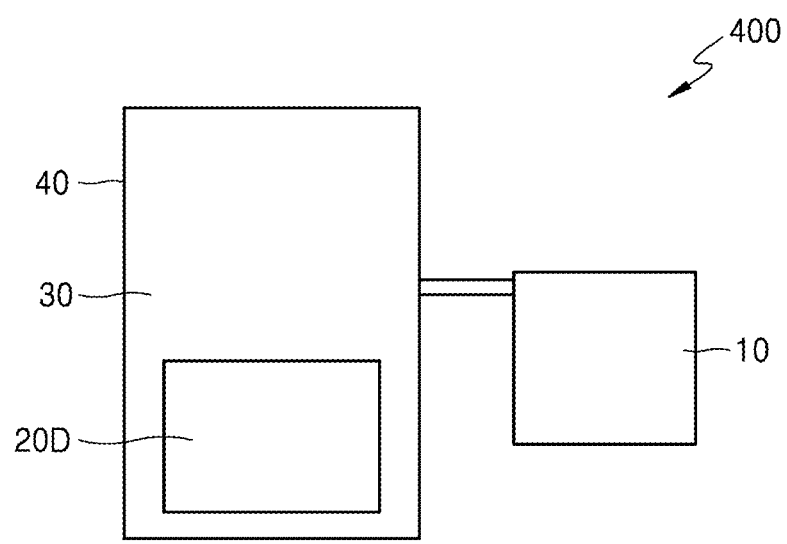
FIG. 5 is a block diagram showing a schematic configuration of an embodiment of a lithium air battery.

FIG. 5 is a block diagram illustrating a schematic configuration of a lithium air battery according to an embodiment. Referring to FIG. 5, a lithium air battery 400 may comprise a lithium air cell 10 and a water vapour supply unit 20D inside a gas storage container 40. The lithium air cell 10 and the water vapour supply unit 20D refer to the aforementioned lithium air cell and the aforementioned water vapour supply unit. The inside of the gas storage container 40 may be an atmospheric, e.g., air, or an atmosphere including air 30. The atmosphere including oxygen may include oxygen in an amount of 99.7 vol % or greater. The water vapour supply unit 20D may supply water vapour, from which carbon dioxide has been removed, into the gas storage container 40 by heating or the like. Water vapour, from which carbon dioxide has been removed, may be mixed with an atmosphere including oxygen or air in the gas storage container 40. The atmosphere including oxygen or air mixed with water vapour may be supplied to the lithium air cell 10 by flowing or the like, and the water vapour and oxygen in the atmosphere including oxygen or air may be used as cathode active materials.

The "air" is not limited to atmospheric air, and may comprise a combination of gases containing oxygen, or pure oxygen ($O_2$) gas. This broad definition of the term "air" applies to all applications, for example air cells, air electrodes, and the like.

The lithium air battery according to one embodiment may be applied to any suitable field to which a secondary battery may be applied.

Hereinafter, the present disclosure will be described in more detail with reference to Examples and Comparative Examples. However, the following Examples are set forth to illustrate a technical idea, and the scope of the present disclosure is not limited to these Examples.

EXAMPLES

Example 1: Manufacture of Lithium Air Battery

Lithium Air Cell
Cathode/LATP/PEGDME/Li Anode

A platinum (Pt) thin film (thickness 5 nanometers (nm)) was formed on a lithium aluminum titanium phosphate ("LATP") film (thickness 250 µm, Ohara Corp., Japan) by physical deposition to prepare a laminate of a cathode and a solid electrolyte layer.

A polymer electrolyte, which is an anode electrolyte, was disposed at the lower side of the solid electrolyte layer. The polymer electrolyte was prepared by mixing polyethylene glycol dimethyl ether ("PEGDME") (number average molecular weight (Mn)=500 Daltons) with lithium bis(trifluoromethylsulfonyl)imide ("LiTFSI"), which is a lithium salt, such that the concentration of lithium is 1 mole per liter (M). A porous separator was impregnated with this solid electrolyte to prepare a polymer electrolyte layer.

A lithium metal foil was disposed on the lower end of the polymer electrolyte layer, a gas diffusion layer ("GDL") (25BC, SGL Corp.) was disposed on the upper end of the cathode, a nickel mesh was disposed on the gas diffusion layer, a pressing member was disposed on the nickel mesh to transfer air to the cathode, and the pressing member pressed the lithium metal foil, the polymer electrolyte layer, the GDL, the cathode, and the nickel mesh, thereby manufacturing a lithium air cell. An atmosphere including 99.9 volume percent oxygen was used.

The manufactured lithium air cell was placed in a 2 liter (L) gas chamber.

Water Vapour Supply Unit 10 milliliters (mL) of distilled water and 100 milligrams (mg) of $Ca(OH)_2$ was introduced into a vial, and mixed to prepare a water vapour supply unit. This water vapour supply was placed in a gas chamber in which the lithium air cell was placed. The temperature in the gas chamber was maintained at 40° C. The relative humidity in the gas chamber was 100%.

Example 2: Manufacture of Lithium Air Battery

A lithium air battery was manufactured in the same manner as in Example 1, except that CaO, instead of $Ca(OH)_2$, was used in the water vapour supply unit.

Comparative Example 1: Manufacture of Lithium Air Battery

A lithium air battery was manufactured in the same manner as in Example 1, except that only distilled water, without $Ca(OH)_2$, was used in the water vapour supply unit.

Evaluation of Charge and Discharge Characteristics of Lithium Air Battery

Evaluation Example 1

After the lithium air cell was stored in the gas chamber for 8 hours, the lithium air battery manufactured in Example 1 was charged and discharged to a cathode capacity of 2,032 milliampere hours per gram (mAh/g) with a constant current having a current density of 0.01 milliamperes per square centimeter (mA/cm$^2$) under an atmosphere including oxygen of 40° C. and 1 atmosphere (atm). The cathode capacity 2032 mAh/g corresponds to 40 nm thickness of a discharge product. In this case, a cut-off voltage had a lower limit of 2.2 volts (V) and an upper limit of 4.5 V, both vs. Li/Li$^+$). When the cut-off voltage reached 4.5 V, the lithium air battery was charged with a constant voltage having a current density of 0.01 mA/cm$^2$. When a discharge potential was 2.2 V or less, the discharge potential was considered to be out of cycle.

Evaluation Example 2

The charge-discharge cycle for the lithium air battery of Example 2 was performed in the same manner as in Evaluation Example 1.

Evaluation Example 3

The charge-discharge cycle for the lithium air battery of Example 3 was performed in the same manner as in Evaluation Example 1, except that this lithium air battery was charged and discharged to a cathode capacity of 20,322 mAh/g corresponding to the thickness of 400 nm of a discharge product for the lithium air battery of Example 1.

Evaluation Example 4

The charge-discharge cycle for the lithium air battery of Example 4 was performed in the same manner as in Evaluation Example 2, except that this lithium air battery was charged and discharged to a cathode capacity of 20,322 mAh/g corresponding to the thickness of 400 nm of a discharge product for the lithium air battery of Example 2 instead of Example 1.

Evaluation Example 5

The charge-discharge cycle for the lithium air battery of Example 5 was performed in the same manner as in Evaluation Example 1, except that this lithium air battery was charged and discharged to a cathode capacity of 40,643 mAh/g corresponding to the thickness of 800 nm of a discharge product for the lithium air battery of Example 1.

Evaluation Example 6

The charge-discharge cycle for the lithium air battery of Example 6 was performed in the same manner as in Evaluation Example 1, except that this lithium air battery was charged and discharged to a cathode capacity of 101,608 mAh/g corresponding to the thickness of 2000 nm of a discharge product for the lithium air battery of Example 1.

Comparative Evaluation Example 1

The charge-discharge cycle for the lithium air battery of Comparative Example 1 instead of Example 1 was performed in the same manner as in Evaluation Example 1.

Comparative Evaluation Example 2

The charge-discharge cycle for the lithium air battery of Comparative Example 1 instead of Example 1 was performed in the same manner as in Evaluation Example 3.

Comparative Evaluation Example 3

The charge-discharge cycle for the lithium air battery of Comparative Example 1 instead of Example 1 was performed in the same manner as in Evaluation Example 6.

Figure 6:
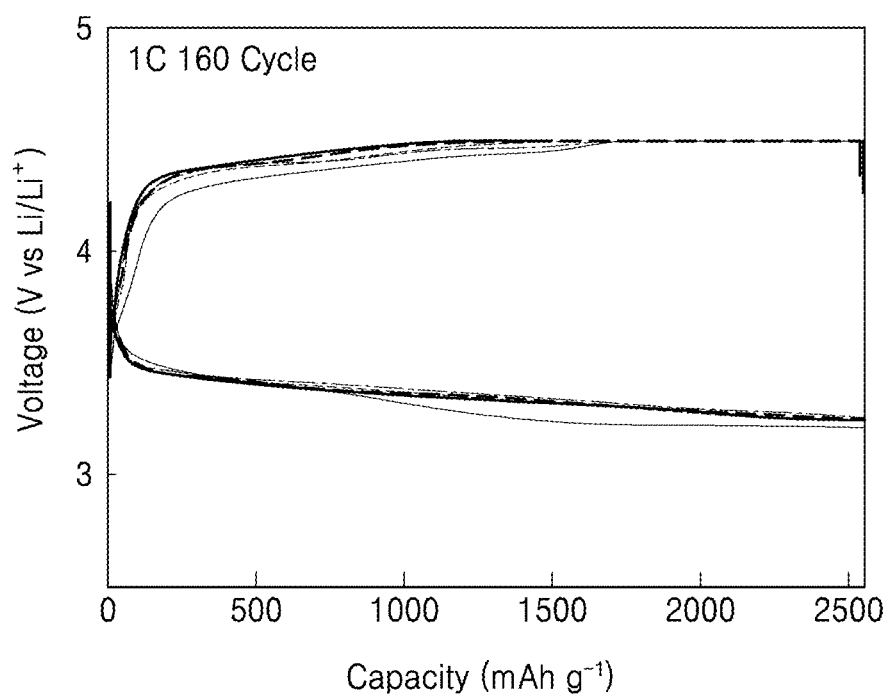
FIG. 6 is a graph of Voltage (volts (V) versus (vs) $Li/Li^+$) versus Capacity (milliamperes hours per gram ($mAh\ g^{-1}$)) of a charge-discharge curve of a lithium air cell of Example 1.
Figure 7:
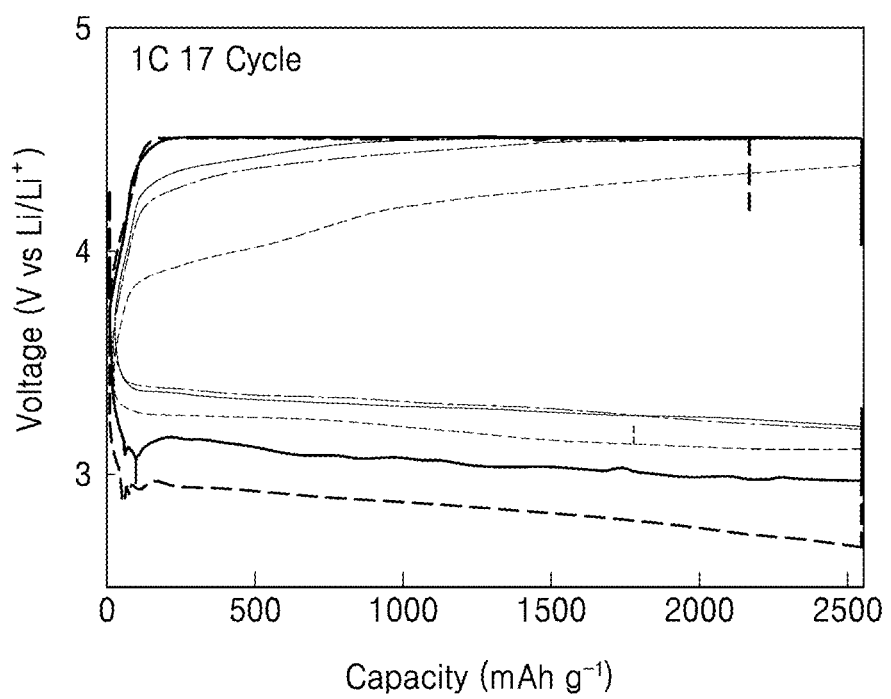
FIG. 7 is a graph of Voltage (V vs $Li/Li^+$) versus Capacity ($mAh\ g^{-1}$) of a charge-discharge curve of a lithium air cell of Comparative Example 1.

FIG. 6 is a charge-discharge curve of a lithium air cell of Example 1. Referring to the graph of FIG. 6, the charge-discharge curve of the lithium air cell of Example 1 was measured for 160 cycles. FIG. 7 is a charge-discharge curve of a lithium air cell of Comparative Example 1. Referring to the graph of FIG. 7, the charge-discharge curve of the lithium air cell of Comparative Example 1 was measured for 17 cycles.

Accordingly, the lifetime of the lithium air battery of Example 1 provided with a water vapour supply unit including a basic metal compound may be improved about 10 times than the lifetime of the lithium air battery of Comparative Example 1 provided with a water vapour supply unit not including a basic metal compound.

The results of charge-discharge cycles of Evaluation Examples 1 to 6 and Comparative Evaluation Examples 1 to 3 are shown in Table 1. Referring to Table 1, it was found that as the charge-discharge capacity increased, the lifecycle of both Evaluation Examples and Comparative Evaluation Examples decreased, but the lifecycles of Comparative Evaluation Examples 1 to 3 decreased more rapidly than those of the corresponding Evaluation Examples 1, 3, and 6.

TABLE 1

| | Cathode capacity | Discharge product | De-carbonate agent | Lifetime |
| --- | --- | --- | --- | --- |
| Evaluation Example 1 | 2,032 mAh/g | 40 nm | Ca(OH)$_2$ | 160 cycles |
| Evaluation Example 2 | 2,032 mAh/g | 40 nm | CaO | 140 cycles |
| Evaluation Example 3 | 20,322 mAh/g | 400 nm | Ca(OH)$_2$ | 8 cycles |
| Evaluation Example 4 | 20,322 mAh/g | 400 nm | CaO | 7 cycles |
| Evaluation Example 5 | 40,643 mAh/g | 800 nm | Ca(OH)$_2$ | 4 cycles |
| Evaluation Example 6 | 101,608 mAh/g | 2000 nm | Ca(OH)$_2$ | 1 cycle |
| Comparative Evaluation Example 1 | 2,032 mAh/g | 40 nm | No. | 17 cycles |
| Comparative Evaluation Example 2 | 40,643 mAh/g | 800 nm | No. | 0 cycles |
| Comparative Evaluation Example 3 | 101,608 mAh/g | 2000 nm | No. | 0 cycles |

Figure 8A:
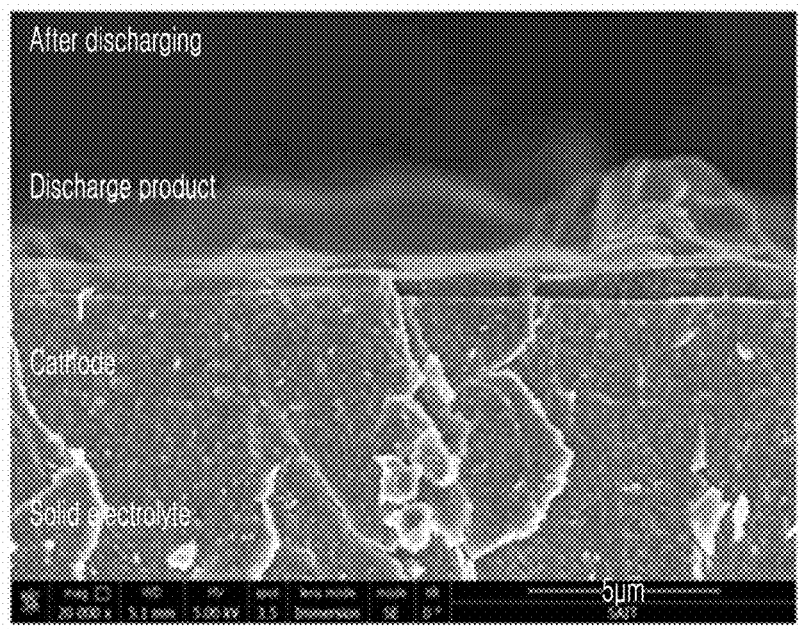
FIG. 8A is a cross-sectional scanning electron microscope (SEM) photograph of the lithium air battery of Example 1 after discharge (a)
Figure 8B:
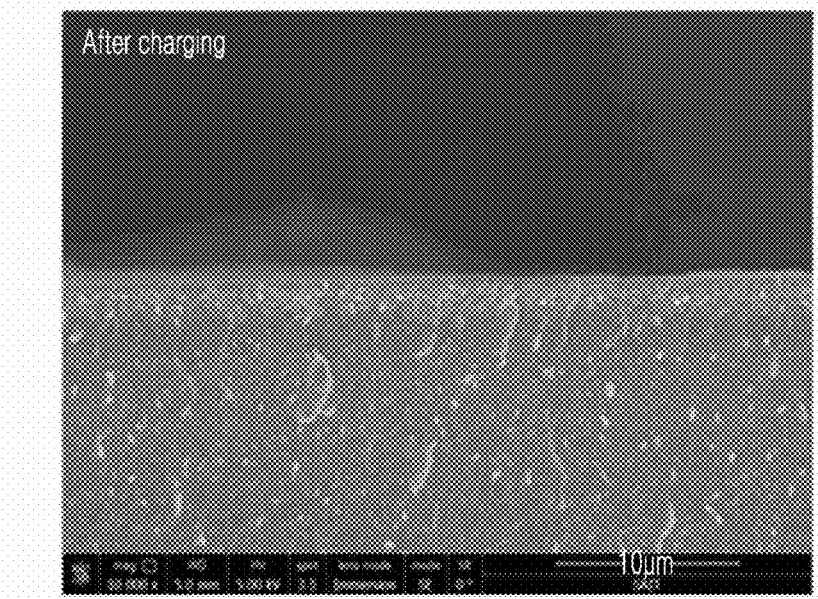
FIG. 8B is a cross-sectional SEM photograph of the lithium air battery of Example 1 after charge (b)

FIG. 8A is a cross-sectional scanning electron microscope (SEM) photograph of the lithium air battery of Example 1 after discharge and FIG. 8B is a cross-sectional SEM photograph of the lithium air battery of Example 1 after charge. In the SEM photograph of FIG. 8A, a discharge product is formed on the cathode after discharging, and this discharge product shows an amorphous form. In the SEM photograph of FIG. 8, a discharge product is not formed on the cathode after charging. Thus, the discharge product formed in the lithium air battery of Example 1 may be reversibly generated and destroyed.

Figure 9A:
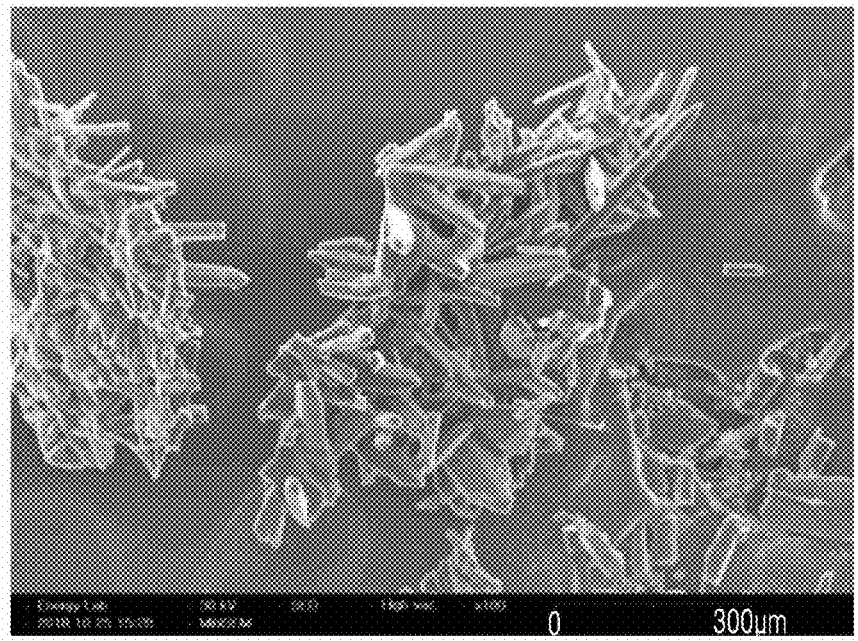
FIG. 9A is a planar SEM photograph of the lithium air battery of Comparative Example 1 after discharging.
Figure 9B:
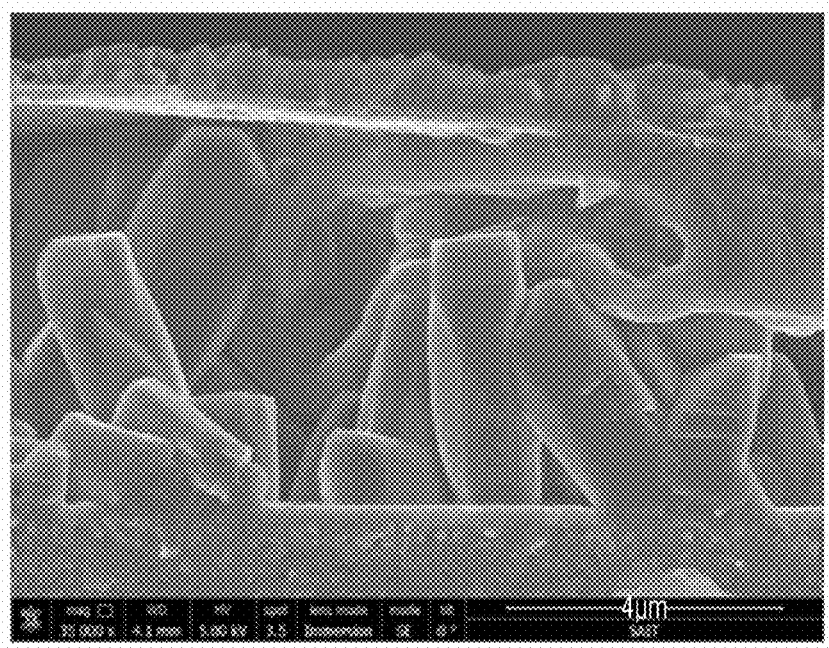
FIG. 9B is a cross-sectional SEM photograph of the lithium air battery of Comparative Example 1 after discharging and FIG. 10 is a graph of intensity (arbitrary units (a.u.)) versus diffraction angle (degrees two-theta (2θ°) showing the results of X-ray diffraction (XRD) analysis of a crystalline discharge product produced at a cathode of the lithium air battery of Comparative Example 1 after discharging, using Cu Kα radiation.

FIG. 9A is a planar SEM photograph of the lithium air battery of Comparative Example 1 after discharging and FIG. 9B is across-sectional SEM photograph of the lithium air battery of Comparative Example 1 after discharging. The discharge products shown in the photographs of FIG. 9A and FIG. 9B show a columnar crystal form.

Figure 10:
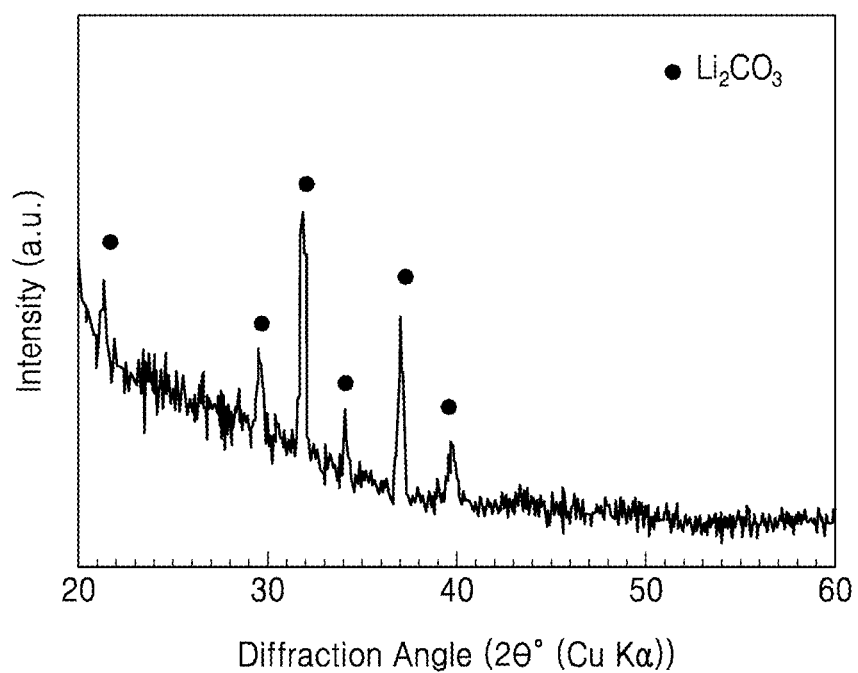

FIG. 10 is an X-ray diffraction (XRD) spectrum of a crystalline discharge product produced at a cathode of the lithium air battery of Comparative Example 1 after discharging. Cu Kα radiation was used to measure the XRD spectrum. In the spectrum of FIG. 10, the peaks of, e.g., at, diffraction angles 2θ=21.3°, 29.4°, 30.5°, 31.7°, 36.1°, and 39.6° are peaks to, e.g., of, a monoclinic crystal structure of $Li_2CO_3$ (refer to Hanawalt et al., Anal. Chem., 10, 475, (1938)). According to the spectrum, crystalline $Li_2CO_3$ may be produced in the lithium air battery of Comparative Example 1 after discharging. The production of crystalline $Li_2CO_3$ is irreversibly not lost during the charging process, and is thus considered to be a cause of shortening the life of the lithium air battery of Comparative Example 1.

The lifetime of the lithium air battery may be improved by supplying water vapour, from which carbon dioxide has been removed, to the lithium air cell.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A lithium air battery comprising:
   a lithium air cell comprising
      a cathode configured to use oxygen and water as a cathode active material,
      an anode capable of storing and releasing lithium ions, and
      an electrolyte disposed between the cathode and the anode; and
   a water vapor supply unit comprising a basic metal compound and water,
   wherein the water vapor supply unit is configured to supply water to the cathode of the lithium air cell.

2. The lithium air battery of claim 1, wherein the basic metal compound comprises an alkaline metal or an alkaline earth metal.

3. The lithium air battery of claim 1, wherein the basic metal compound comprises NaOH, CaO, $Ca(OH)_2$, MgO, or $Mg(OH)_2$.

4. The lithium air battery of claim 1, wherein a concentration of the basic metal compound in a solution including the basic metal compound in the water vapor supply unit is about 0.1 grams per liter to about 1 gram per liter.

5. The lithium air battery of claim 1, wherein a solution including the basic metal compound in the water vapor supply unit has a pH of 9 to 14.

6. The lithium air battery of claim 1, wherein the water vapor supply unit is configured to supply water vapor from which an acidic impurity is removed.

7. The lithium air battery of claim 6, wherein the acidic impurity comprises carbon dioxide.

8. The lithium air battery of claim 1, further comprising
   a gas storage container in which the lithium air cell and the water vapor supply unit are located, and
   wherein the gas storage container contains an atmosphere comprising oxygen.

9. The lithium air battery of claim 1, comprising
   a gas storage container containing an atmosphere comprising oxygen in which the lithium air cell is disposed, and
   wherein the water vapor supply unit is in fluid communication with the gas storage container to supply water vapor to the gas storage container.

10. The lithium air battery of claim 1, wherein
    the water vapor supply unit comprises a membrane on a surface of the lithium air cell, and
    the membrane comprises a solution including the basic metal compound.

11. The lithium air battery of claim 10, wherein the membrane is located on the cathode of the lithium air cell.

12. The lithium air battery of claim 10, wherein the membrane comprises a nonwoven fabric.

13. The lithium air battery of claim 1, comprising
    a gas storage container having an atmosphere comprising oxygen in which the water vapor supply unit is located, and
    wherein the gas storage container is in fluid communication with the lithium air cell and is configured to supply water vapor and oxygen to the lithium air cell.

14. The lithium air battery of claim 13, wherein the gas storage container is configured to supply water vapor and oxygen from the gas storage container to the cathode of the lithium air cell.

15. The lithium air battery of claim 1, wherein the cathode comprises a porous conductive material.

16. The lithium air battery of claim 1, wherein the anode comprises lithium.

17. The lithium air battery of claim 1, wherein the electrolyte comprises a solid electrolyte.

18. The lithium air battery of claim 1, wherein the electrolyte comprises a liquid electrolyte.

19. The lithium air battery of claim 18, wherein the liquid electrolyte comprises an organic electrolyte.

20. The lithium air battery of claim 1, wherein the electrolyte comprises an aqueous electrolyte.

* * * * *